(12) United States Patent
Larsson et al.

(10) Patent No.: US 7,873,009 B2
(45) Date of Patent: Jan. 18, 2011

(54) METHOD AND SYSTEM OF RADIO COMMUNICATIONS OF TRAFFIC WITH DIFFERENT CHARACTERISTICS

(75) Inventors: Peter Larsson, Solna (SE); Erik Dahlman, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 723 days.

(21) Appl. No.: 10/596,683

(22) PCT Filed: Dec. 22, 2003

(86) PCT No.: PCT/SE03/02055
§ 371 (c)(1),
(2), (4) Date: Jun. 21, 2006

(87) PCT Pub. No.: WO2005/062504
PCT Pub. Date: Jul. 7, 2005

(65) Prior Publication Data
US 2007/0097899 A1  May 3, 2007

(51) Int. Cl.
*H04W 4/00* (2009.01)
(52) U.S. Cl. .......... 370/330; 370/352; 370/310; 370/329; 370/437; 455/450; 455/452.1
(58) Field of Classification Search ............ 455/450; 370/329, 347, 330
See application file for complete search history.

(56) References Cited

U.S. PATENT DOCUMENTS

| | | | | |
|---|---|---|---|---|
| 5,751,704 A | * | 5/1998 | Kostic et al. ............. | 370/335 |
| 6,064,662 A | * | 5/2000 | Gitlin et al. ............. | 370/330 |
| 6,097,703 A | | 8/2000 | Larsen et al. | |
| 6,236,862 B1 | * | 5/2001 | Erten et al. ............. | 455/501 |
| 6,496,531 B1 | * | 12/2002 | Kamel et al. ............ | 375/130 |
| 6,678,527 B1 | * | 1/2004 | Rasanen .................. | 455/450 |
| 7,099,629 B1 | * | 8/2006 | Bender ..................... | 455/69 |
| 7,164,649 B2 | * | 1/2007 | Walton et al. ............ | 370/203 |
| 7,230,991 B2 | * | 6/2007 | Sang et al. ............... | 375/260 |
| 2001/0043576 A1 | * | 11/2001 | Terry ....................... | 370/328 |
| 2002/0051425 A1 | | 5/2002 | Larsson | |
| 2002/0141367 A1 | | 10/2002 | Hwang et al. | |
| 2002/0181546 A1 | | 12/2002 | Odenwalder et al. | |
| 2002/0193133 A1 | * | 12/2002 | Shibutani ................ | 455/522 |

(Continued)

FOREIGN PATENT DOCUMENTS

EP    1351424 A2    10/2003

(Continued)

OTHER PUBLICATIONS

Liu et al., "Opportunistic Transmission Scheduling with Resource-Sharing Constraints in Wirless Networks" Dec. 2000, Purdue University, All pages.*

(Continued)

*Primary Examiner*—Nick Corsaro
*Assistant Examiner*—Issak R Jama
(74) *Attorney, Agent, or Firm*—Roger S. Burleigh

(57) ABSTRACT

The present invention relates to communications. More especially it relates to communications over radio links subject to fading or otherwise intermittently unreliable. Particularly it relates to high data rate communications and combinations of conventional and opportunistic communications within a communications system.

3 Claims, 4 Drawing Sheets

U.S. PATENT DOCUMENTS

| | | | |
|---|---|---|---|
| 2003/0101274 A1 | 5/2003 | Yi et al. | |
| 2003/0147655 A1 | 8/2003 | Shattil | |
| 2003/0203741 A1 | 10/2003 | Matsuo et al. | |
| 2004/0095903 A1* | 5/2004 | Ryan et al. | 370/329 |
| 2004/0103435 A1* | 5/2004 | Yi et al. | 725/81 |
| 2004/0233918 A1 | 11/2004 | Larsson et al. | |
| 2005/0003768 A1* | 1/2005 | Laroia et al. | 455/101 |
| 2005/0181799 A1* | 8/2005 | Laroia et al. | 455/450 |
| 2006/0111148 A1* | 5/2006 | Mukkavilli et al. | 455/562.1 |

FOREIGN PATENT DOCUMENTS

| | | |
|---|---|---|
| WO | WO 02/39595 A2 | 5/2002 |
| WO | WO 03058988 A1 | 7/2003 |
| WO | WO 03096571 A1 | 11/2003 |

OTHER PUBLICATIONS

3GPP. 3rd Generation Partnership Project, Technical Specification Group Radio Access Network: Physcial layer aspects of UTRA High Speed Downlink Packet Access (Release 4) 3G TS 25.648 v4.0.0 (Mar. 2001).

* cited by examiner

METHOD AND SYSTEM OF RADIO COMMUNICATIONS OF TRAFFIC WITH DIFFERENT CHARACTERISTICS

TECHNICAL FIELD OF THE INVENTION

The present invention relates to communications. More especially it relates to communications over radio links subject to fading or otherwise intermittently unreliable. Particularly it relates to high data rate communications over such links.

BACKGROUND AND DESCRIPTION OF RELATED ART

High-speed downlink packet access in radio communications system for communications of data over radio links in direction from a radio base station to mobile user equipment is previously known. In high-speed downlink packet access data is generally buffered as need be and transmitted to the receiver at a speed as high as possible considering recent estimates of channel quality. During periods of severely disturbed channels data rate is reduced to zero and no data is transmitted. In this sense the communication is opportunistic.

Prior art example systems where opportunistic communications is incorporated, at least partially, are High Speed Downlink Packet Access (in UMTS), HSDPA, High Data Rate (in CDMA2000), HDR, Selection Diversity Forwarding, SDF, and Multiuser Diversity Forwarding, MDF. Selection Diversity Forwarding is a routing/channel access scheme for an unreliable broadcast oriented medium, selecting a preferable route of forwarding messages depending on outcome of multicasting and e.g. forward progress, cost progress or queue status. MDF is also a routing protocol. SDF and MDF are described in U.S. Patent Application No. 2002/0051425 and U.S. Patent Application No. 60/461839.

In contrast to opportunistic communications conventional radio communications utilize a set of one or more radio channels, the radio communication system adjusting transmission power to the various channels by means of transmission power control striving to achieve (at least) minimum quality requirements. Conventional radio communications have a long-term record of efficiently carrying voice traffic and real-time data traffic. Reliability of conventional data channels may be increased by, e.g., forward error control, FEC, and automatic repeat request, ARQ.

Examples of earlier known channel quality measures are channel signal to noise ratio, SNR, carrier to interference ratio, CIR, received power, received symbol energy, bit error rate, BER, and block error rate, BLER.

U.S. Pat. No. 6,097,703 discloses a multi-hop packet radio communication system utilizing opportunistic peak-mode transmissions to transmit data between originating and destination stations via one or more intermediate stations. Each station monitors the activity of other stations in the network, storing connectivity information for use in subsequent transmissions. Each station also sends out probe signals from time to time, to establish which other stations are in range.

N. Souto, J. C. Silva, A. Correia, F. Cercas, A. Rodrigues: '*UMTS AWGN Simulation Results for Uplink, Downlink and HSDPA transmissions,*' 2002 describes simulation results in terms of BER (bit error rate) and BLER (block error rate) of HSDPA (High Speed Downlink Packet Access). Downlink rates up to 384 kbps and HSDPA 1600 kbps and 2352 kbps modes were also simulated. For downlink and HSDPA modes, interference is claimed to have no effect in the AWGN channel due to the orthogonal features of spreading codes.

U.S. Patent Application US2002/0141367 discloses a radio communication system implementing both HSDPA and conventional asynchronous communications using different logical channels for control information related to HSDPA and DPDCH (Dedicated Physical Data Channel) respectively.

$3^{rd}$ Generation Partnership Project (3GPP): *Technical Specification Group Radio Access Network, Physical layer aspects of UTRA High Speed Downlink Packet Access (Release 4), 3G TS 25.848* v4.0.0, France, March 2001, describes the physical layer aspects of the techniques behind the concept of high-speed downlink packet access (HSDPA) and includes performance and complexity evaluation of HSDPA. Chapter 6 discusses HSDPA mapping to physical channels.

None of the cited documents above discloses separating or orthogonalizing respective physical traffic channels for opportunistic communications and conventional communications.

SUMMARY OF THE INVENTION

If conventional communications channels and channels for opportunistic communications share the same communications resources they may interfere. Particularly, power control of conventional channels increases transmission power, e.g., when the receiver perceives poor signal to noise ratios due to signal fading. The transmission power is then controlled to vary basically contrary to the fading. This transmission power variation causes correspondingly varying interference to, among others, users of opportunistic communications. Such system generated varying interference reduces reliability of channel quality estimates important for opportunistic communications. It also implies requirements on more frequent channel estimates, loading the system, and overall reduced data rates on the opportunistic communications channels.

Consequently, there is a need of reducing or eliminating interference from channels for conventional communications on channels for opportunistic communications.

It is consequently an object of the present invention to achieve a radio communications system providing increased immunity to interference from conventional communications channels to opportunistic communications channels.

It is also an object to achieve a system that can exploit fading dips of interfering signals for opportunistic communications.

Another object is to achieve a system capable of providing transmission opportunities on opportunistic communications channels for traffic that is traditionally transmitted on conventional channels e.g. voice.

Finally, it is an object to increase system performance and allow for overall higher data rates.

These objects are met by a method and system of channel allocation operating in various domains.

DESCRIPTION OF PREFERRED EMBODIMENTS

Figure 1:
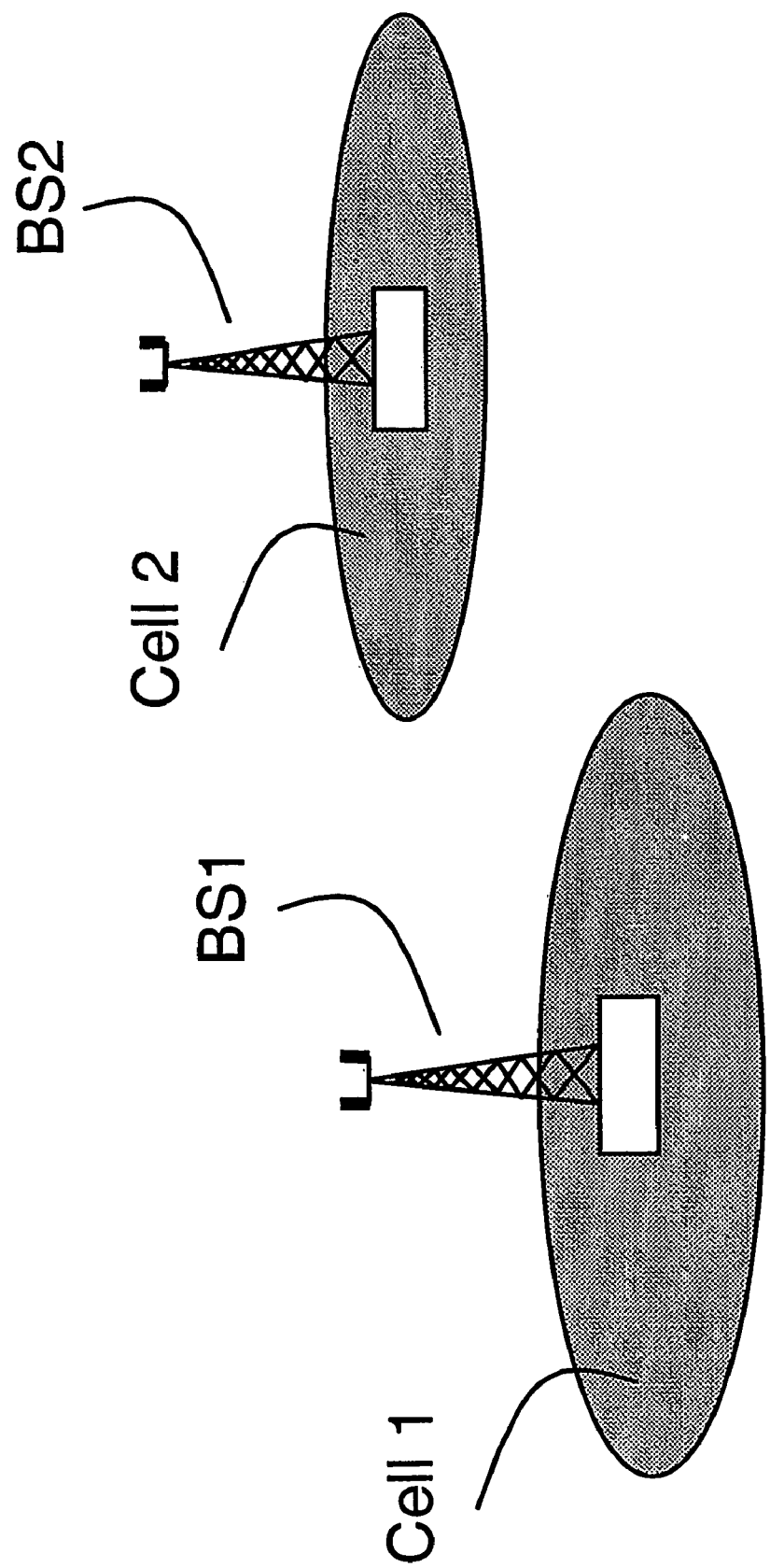
FIG. 1 depicts two radio communications cells, each comprising a base station, for both conventional and opportunistic radio communications according to the invention.

Most radio channels are subject to CIR fluctuations. These fluctuations may be due to, e.g., signal strength variations (of desired signal) caused by channel induced fading, varying interference level due to interference power control, interfering signal strength variations caused by channel induced fading, interference variations due to (traffic related) varying number of interfering signals or adaptive antennas transmitting interfering signals (beamforming) with varying antenna radiation pattern.

Opportunistic communications rely heavily on scheduling and rate control, achieved by e.g. buffering and adaptive coding. Thereby, a gain from statistically multiplexing of a great number of user channels can be achieved, such that at least one user can make use of the communications resources at, at least intermittently, great performance. Consequently, for a particular user the scheduling is dependent on time and frequency variations of the communication channel allocated to the user. Due to the statistical multiplexing overall performance can be increased and high data rate communications achieved also for channels historically considered unreliable due to e.g. CIR fluctuations.

If conventional communications channels and channels for opportunistic communications share the same communications resources, however, they may interfere. Particularly, power control of conventional channels increases transmission power, e.g., when the receiver perceives poor signal to noise ratios due to signal fading. The transmission power varies basically contrary to the fading. This transmission power variation causes correspondingly varying interference to among others users of opportunistic communications. Such system generated varying interference reduces reliability of channel quality estimates important for opportunistic communications. It also implies requirements on more frequent channel estimates, loading the system, and overall reduced data rates on the opportunistic communications channels.

According to a preferred embodiment of the invention conventional and opportunistic communications are split in non-overlapping or minimally overlapping channels in one-dimensional domain, such as on a time-grid for TDM (Time Division Multiplex).

According to a second embodiment, the different communications are split in two-dimensional domain, such as time-frequency for OFDM (Orthogonal Frequency Division Multiplex).

In a further embodiment the channels are separated in code domain, to be used as one-dimensional separation or combined with one or more other one- or plural-dimensional domain separations to minimize cross-characteristics interference. Example codes are LAS (Large Area Synchronized) spreading codes. The invention is applicable in general to separation in arbitrary dimensional domain, where the plural-dimensional domain includes time, frequency or code.

Preferably, according to the invention interference in terms of signal to interference ratio is minimized. However, most interference related quality measures, such as those mentioned on p. 2, could be applied.

A particular problem entails from neighboring cells, where conventional communications of one cell may interfere with opportunistic communications of another cell. To minimize the risk of interference between cells where demand for conventional and opportunistic communications differ between cells, and hence some overlap will occur if all channels are occupied, different modes of the invention allocates channels such as to minimize use of common resources considering a limited number of domain dimensions.

FIG. 1 depicts two radio communications cells <<Cell 1>>, <<Cell 2>>, each comprising a base station <<BS 1>>, <<BS 2>>, for both conventional and opportunistic radio communications according to the invention. Depending on, among other things, geographical distance and terrain between neighboring radio communications cells <<Cell 1>>, <<Cell 2>> radio emissions from the respective base stations antennas may interfere with (desired) communications of the neighboring cell.

Figure 2:
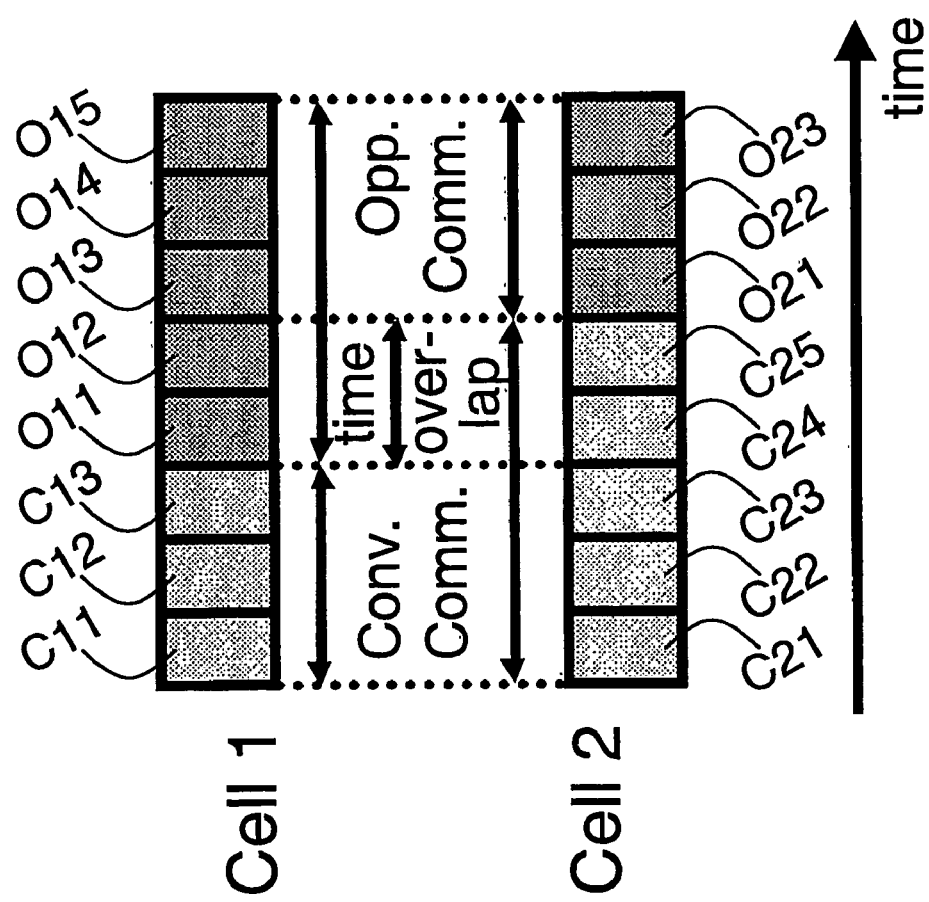
FIG. 2 illustrates one-dimensional domain overlap in time domain for TDM (Time Division Multiplex) according to the invention.

FIG. 2 illustrates one-dimensional domain time-overlap for TDM. In a first radio communications cell <<Cell 1>>, three time slots <<C11 >>, <<C12>>, <<C13>> out of eight <<C11>>, <<C12>>, <<C13>>, <<O11>>, <<O12>>, <<O13>>, <<O14>>, <<O15>> are allocated for conventional communications and five time slots <<O11>>, <<O12>>, <<O13>>, <<O14>>, <<O15>> are allocated for opportunistic communications. In a second cell <<Cell 2>> five time slots <<C21>>, <<C22>>, <<C23>>, <<C24>>, <<C25>> are allocated for conventional communications and three <<O21>>, <<O22>>, <<O23>> for opportunistic communications. As the fractional allocation of conventional and opportunistic communications is different for cells 1 and 2 and all time slots are allocated, opportunistic communications time-slots in cell 2 cannot be completely separated from conventional communications time-slots of cell 2 in a one-dimensional domain such as time-domain. The interference in this example allocation is minimized when the number of overlapping time slots of different communications in the two cells is minimized. In the figure, two time-slots of opportunistic communications <<O11>>, <O12>> of cell 1 overlap in time with two time-slots of conventional communications <<C24>>, <<C25>> of cell 2.

Figure 3:
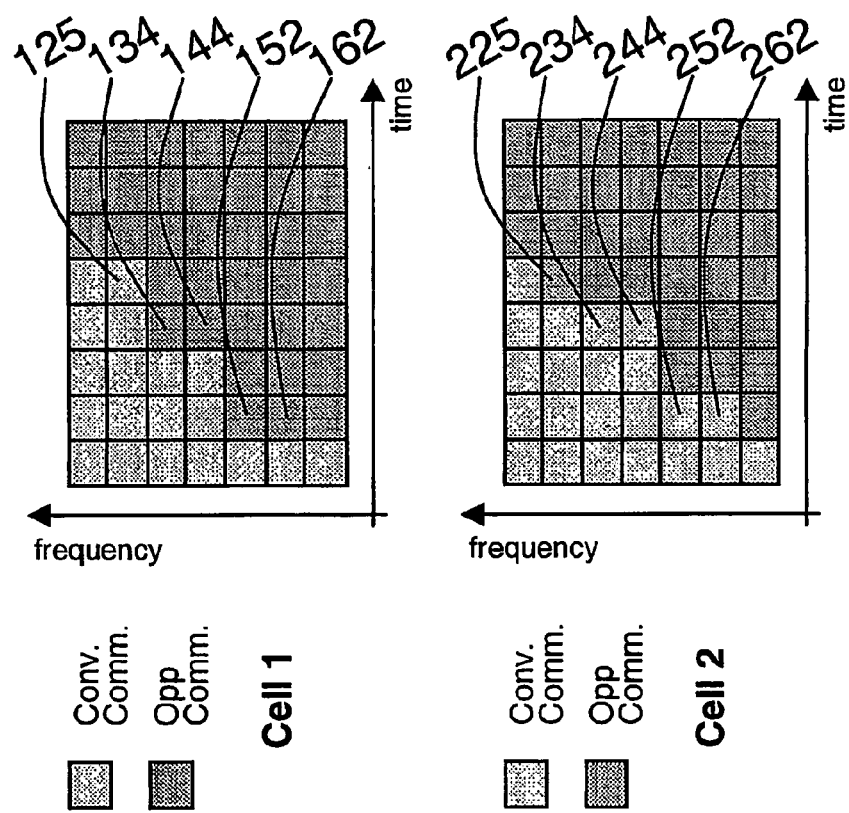
FIG. 3 shows separation of conventional communications and opportunistic communications in two-dimensional time-frequency domain according to the invention.

FIG. 3 shows separation of conventional communications and opportunistic communications in two-dimensional time-frequency domain. In a first cell <<Cell 1>> of a cellular radio communications system a number of time-frequency slots <<125>> are allocated for conventional communications and a number of slots allocated for opportunistic communications <<134>>, <<144>>, <<152>>, <<162>>. In a second radio cell <<Cell 2>> the allocation is somewhat different due to different demand on conventional and opportunistic communications channels, respectively. A time-frequency slot <<225>>, for which corresponding slot in cell 1 <<125>> was allocated for conventional communications, is allocated for opportunistic communications and four time-frequency slots <<234>>, <<244>>, <<252>>, <<262>>, with correspondences <<134>>, <<144>>, <<152>>, <<162>> allocated for opportunistic communications in cell 1, are allocated for conventional communications. For both slot allocations of FIG. 3 the time-frequency range is identical. Obviously five slots <<225>>, <<234>>, <<244>>, <<252>>, <<262>> of cell 2 overlap in time and frequency with <<125>>, <<134>>, <<144>>, <<152>>, <<162>> of cell 1. The number of overlapping time-frequency slots may be reduced to three by e.g. swapping allocations of two slots of cell 1 for which cell 2 has a different allocation. If, e.g., slot <<125>> were allocated for opportunistic communications and slot <<134>> allocated for conventional communications the allocations would be of same types for both radio cells <<Cell 1>>, <<Cell 2>> for all by three time-slots <<144>>, <<152>>, <<162>>, <<244>>, <<252>>, <<262>>.

The two-dimensional example above illustrates that interference effect may be reduced not only by minimizing number of overlapping slots, but also by careful selection of which communications should be subject to interference from neighbor-cell slots with communications of different characteristics. Also, instead of reducing number of overlapping slots, a "sufficiently small" interference could be accepted an approximate minimum when further minimization would yield no or small perceived quality improvement. As mentioned above, the criteria to minimize, for true minimum or satisfaction, could be e.g. signal to interference ratio, SIR, or any of the criteria mentioned on p. 2 such as carrier to interference ratio, CIR.

In one mode of the invention it is adapted for combination with various well-known means of controlling the resource allocation in a dynamic manner incorporating centralized or decentralized/distributed resource allocation. The adaptation time schedule on which the resources are allocated may be long or short term. For the short term, resource allocation can change from call to call, or even adapt to instantaneous channel conditions, whereas the long term allocation may change, on a diurnal basis, e.g. between peak hours and off-peak hours. The resource allocation can also be of static nature defined at system initiation.

Figure 4:
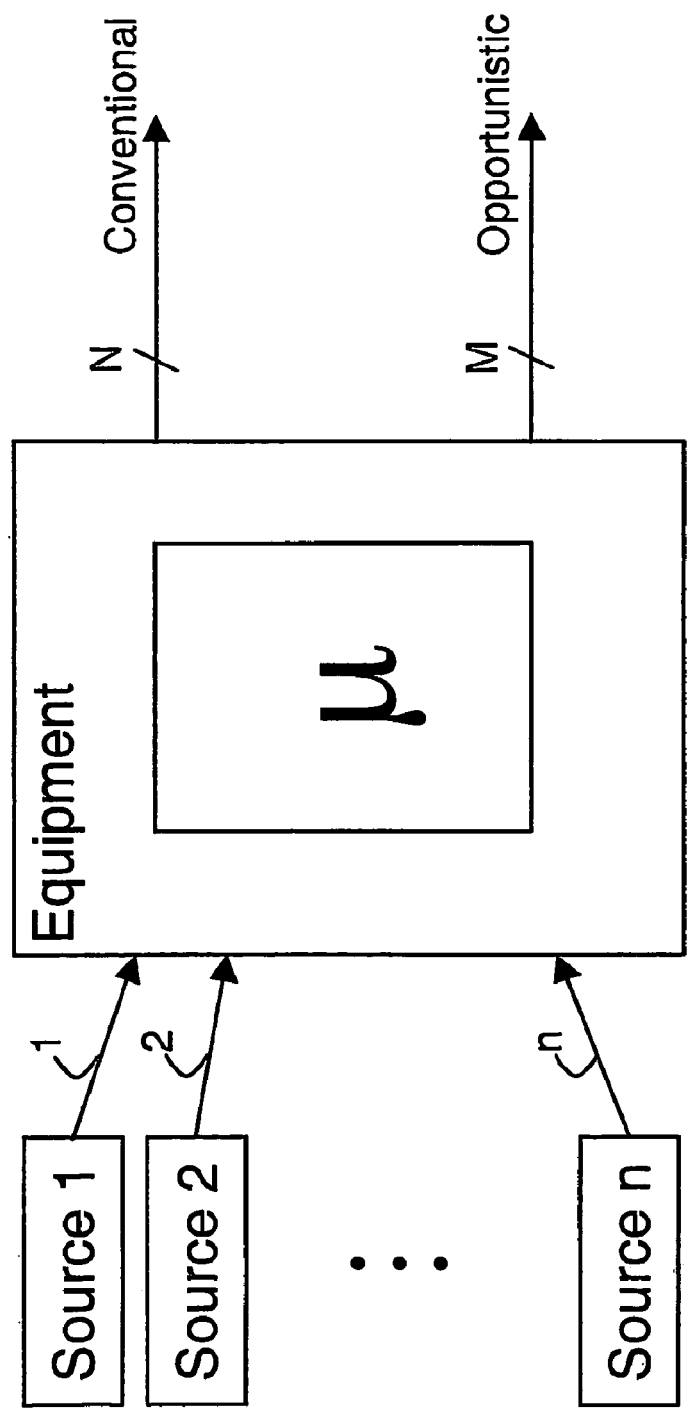
FIG. 4 illustrates equipment according to the principles of the invention.

FIG. 4 schematically illustrates equipment <<Equipment>> according to the invention. A number of information sources <<Source 1>>, <<Source 2>>, . . . , <<Source n>> comprising, e.g., speech or data are connected 1, 2, . . . , n to the equipment which may be fixed radio equipment, e.g. equipment of a radio access network, or mobile equipment, e.g. user equipment. For equipment of a radio access network, the sources may be connected through a gateway (not illustrated) or other network equipment, the radio access network equipment separating and transmitting conventional and opportunistic <<Opportunistic>> communications over N conventional slots/channels <<Conventional>> and M opportunistic slots/channels <<Opportunistic>>, for non-negative integers N and M, as described in relation to FIGS. 2 and 3.

For mobile equipment one or more sources <<Source 1>>, <<Source 2>>, . . . , <<Source n>> of FIG. 4 may be related to equipment integrated within, e.g., a mobile station, such as stored data or applications, or be connected to, e.g., a mobile station essentially operating as an interface for information transfer. In a preferred mode of the invention, the mobile equipment receives information from a network controller related to particular allocation of the traffic channels on a control channel (not illustrated).

The network allocation control can be centralized, decentralized or distributed. With centralized control the network controller is responsible for channel allocation within a wide area, such as for a switching center or access point to the Internet, with a plurality of base stations <<BS 1>>, <<BS 2>>. In a decentralized realization local network controllers are responsible for channel allocation, that nevertheless is coordinated between neighboring areas, for which local network controllers are responsible. In a distributed system, the local controllers have limited responsibility and assist one or more central controller to achieve the final allocation. Decentralized or distributed allocation control is not restricted to radio access network controllers but can include mobile equipment.

The invention is not intended to be limited only to the embodiments described in detail above. Changes and modifications may be made without departing from the invention. It covers all modifications within the scope of the following claims.

The invention claimed is:

1. A cellular radio communications system comprising: a first radio communications equipment, located within a first cell, for communicating traffic with different characteristics, the traffic being divided into two or more categories including conventional communications and opportunistic communications which, transfer with different characteristics, wherein conventional communications comprise communications in which transmission power for various channels is adjusted to achieve at least minimum quality requirements and wherein opportunistic communications use scheduling and rate control to transfer traffic, the first radio communications equipment further comprising processing circuitry for allocating traffic transmissions that use conventional communications to physically wholly or partially separated channels to the traffic transmissions that use opportunistic communications; a second radio communications equipment, located within a second cell, for communicating traffic with different characteristics, the traffic being divided into two or more categories including conventional communications and opportunistic communications which transfer with different characteristics, wherein conventional communications comprise communications in which transmission power for various channels is adjusted to achieve at least minimum quality requirements and wherein opportunistic communications use scheduling and rate control to transfer traffic, the second radio communications equipment further comprising processing circuitry for allocating traffic transmissions that use conventional communications to physically wholly or partially separated channels to the traffic transmissions that use opportunistic communications; and processing circuitry configured to identify channels within the first cell and the second cell, analyze the identified channels to determine overlapping time slots, frequency slots or time-frequency slots that contain the different types of traffic in the identified channels, and allocate traffic of different characteristics of different cells by which allocation interference between differently characterized communications of neighboring cells is minimized, wherein the processing circuitry allocates the traffic of different characteristics of the different cells by minimizing a number of the time slots, the frequency slots or the time-frequency slots which overlap and contain different types of traffic that are transmitted from the first and second radio communications equipment in the different cells.

2. The radio communications system according to claim 1 comprising the processing circuitry maximizing signal to interference ratio or carrier to interference ratio of time slots, frequency slots or time-frequency slots, if any, of communications with different characteristics in the different cells.

3. A controller that interfaces with a first radio communications equipment and a second radio communications equipment wherein: the first radio communications equipment, located within a first cell, for communicating traffic with different characteristics, the traffic being divided into two or more categories including conventional communications and opportunistic communications which transfer with different characteristics, wherein conventional communications comprise communications in which transmission power for various channels is adjusted to achieve at least minimum quality requirements and wherein opportunistic communications use scheduling and rate control to transfer traffic, the first radio communications equipment further comprising processing circuitry for allocating traffic transmissions that use conventional communications to physically wholly or partially separated channels to the traffic transmissions that use opportunistic communications; and the second radio communications equipment, located within a second cell, for communicating traffic with different characteristics, the traffic being divided into two or more categories including conventional communications and opportunistic communications which transfer with different characteristics, wherein conventional communications comprise communications in which transmission power for various channels is adjusted to achieve at least minimum quality requirements and wherein opportunistic communications use scheduling and rate control to transfer traffic, the second radio communications equipment further comprising processing circuitry for allocating traffic transmissions that use conventional communications to physically wholly or partially separated channels to the traffic transmissions that use opportunistic communications, the controller comprising: processing circuitry configured to identify channels within the first cell and the second cell, analyze the identified channels to determine overlapping time slots, frequency slots or time-frequency slots that contain the different types of traffic in the identified channels, and allocate traffic of different characteristics of different cells by which allocation interference between differently characterized communications of neighboring cells is minimized, wherein the processing circuitry allocates the traffic of different characteristics of the different cells by minimizing a number of the time slots, the frequency slots or the time-frequency slots which overlap and contain different types of traffic that are transmitted from the first and second radio communications equipment in the different cells.

\* \* \* \* \*